(12) United States Patent
Huber et al.

(10) Patent No.: US 8,797,546 B2
(45) Date of Patent: Aug. 5, 2014

(54) INTERFEROMETRIC DISTANCE MEASUREMENT DEVICE USING A SCANNING PLATE AND TRANSPARENT CARRIER SUBSTRATE CONTAINING A REFLECTOR ELEMENT

(75) Inventors: Walter Huber, Traunstein (DE); Ralph Joerger, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 312 days.

(21) Appl. No.: 13/423,481

(22) Filed: Mar. 19, 2012

(65) Prior Publication Data

US 2012/0242994 A1    Sep. 27, 2012

(30) Foreign Application Priority Data

Mar. 23, 2011   (DE) .......................... 10 2011 005 937

(51) Int. Cl.
*G01B 11/02*         (2006.01)
(52) U.S. Cl.
USPC ........................................................ 356/498
(58) Field of Classification Search
CPC .. G01B 9/02061; G01B 11/026; G01B 11/14; G01B 2290/30; G01B 2290/45; G01B 2290/70
USPC ................................................. 356/450–521
See application file for complete search history.

(56) References Cited

U.S. PATENT DOCUMENTS 4,693,605 A * 9/1987 Sommargren ................ 356/487
6,369,951 B1 * 4/2002 Spanner ........................ 359/629
2002/0015153 A1 * 2/2002 Downs .......................... 356/450
2004/0150833 A1 * 8/2004 Downs .......................... 356/498
2006/0262315 A1 * 11/2006 Spanner ........................ 356/450
2007/0013920 A1 * 1/2007 Holzapfel ..................... 356/616
2007/0188767 A1 * 8/2007 Spanner et al. ............... 356/498
2011/0235051 A1 * 9/2011 Huber et al. .................. 356/499

FOREIGN PATENT DOCUMENTS

DE    10 2007 016 774 A1    10/2008

OTHER PUBLICATIONS

Schmitz, M., et al., "Gratings in the Resonance Domain as Polarizing Beam Splitters," Optics Letters, vol. 20, No. 17, Sep. 1, 1995, pp. 1830-1831.

* cited by examiner

*Primary Examiner* — Tarifur Chowdhury
*Assistant Examiner* — Michael P Lapage
(74) *Attorney, Agent, or Firm* — Brinks Gilson & Lione (57) ABSTRACT

An interferometric distance measurement device that includes a light source that emits a beam of light and a scanning unit. The scanning unit includes a scanning plate having a splitter that splits the beam of light into a measurement beam and a reference beam, wherein the reference beam is propagated solely within the scanning plate before reaching interferential superposition with the measurement beam at a unification site. A reflector is provided, wherein the reflector is embodied such that the measurement beam striking the reflector undergoes retroreflection in a direction regardless of any possible relative tilting of the scanning unit and of the reflector downstream of the unification site. A detector arrangement is provided in which a distance signal relating to a distance between the scanning plate and the reflector is detectable from interference between the measurement beam and the reference beam.

13 Claims, 9 Drawing Sheets

PRIOR ART

INTERFEROMETRIC DISTANCE MEASUREMENT DEVICE USING A SCANNING PLATE AND TRANSPARENT CARRIER SUBSTRATE CONTAINING A REFLECTOR ELEMENT

RELATED APPLICATIONS

Applicants claim, under 35 U.S.C. §119, the benefit of priority of the filing date of Mar. 23, 2011 of a German patent application, copy attached, Serial Number 10 2011 005 937.7, filed on the aforementioned date, the entire contents of which is incorporated herein by reference.

BACKGROUND

1. Technical Field

The present invention relates to an interferometric distance measurement device.

2. Background Information

An example of such a device is known from German patent disclosure DE 10 2007 016 774 A1, for example. This device includes a light source, and a scanning unit with a scanning plate in the form of a transparent glass plate. A splitter, which splits a beam emitted by the light source into at least one measurement beam and at least one reference beam, are disposed on the glass plate. A reflector spaced apart in the direction of the propagation direction of the beams is also provided. The resultant interference signals are detected via a detector arrangement. The interference signals are due to the superposition of the measurement beam and the reference beam. The measurement beam is propagated in the direction of the reflector and from there is reflected back to the scanning plate. The reference beam is guided solely within the scanning plate and finally, at a unification site with the measurement beam, it is made to undergo interferential superposition. From the interference signals obtained from this, the distance between the scanning plate and the reflector, and the changes in the distance between these components, can be ascertained in a known manner. Such devices can be used, for instance, in semiconductor production equipment, for example so that, besides the two-dimensional displacement information obtained with regard to a wafer table, additional information regarding possible tilting of the table can also be made available. What is disadvantageous in the device known from DE 10 2007 016 774 A1 is especially that in the event of tilting of the reflector and scanning unit, the result is erroneous distance signals, and the degree of modulation and signal amplitudes of these signals can be a major disruption if even only slight tilting occurs.

Figure 9A:
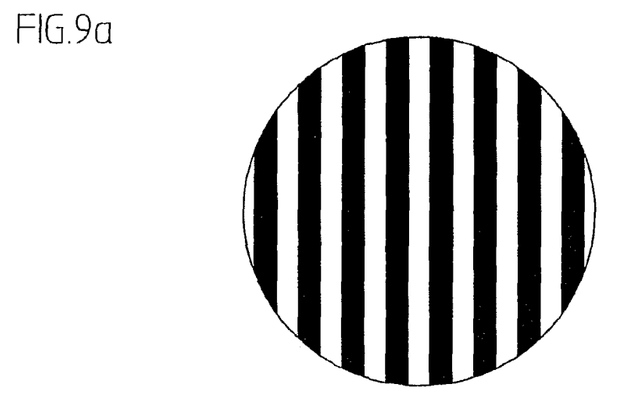
FIG. 9a is an illustration of a possible fringe pattern, resulting in the detection plane of the device of the prior art, in an untilted state.

In FIG. 9a, the fringe pattern that results in the untilted state in the detection plane of a device according to the prior art is shown in schematic form. It is for scanning this fringe pattern that the detector arrangement is typically optimized.

Figure 9B:
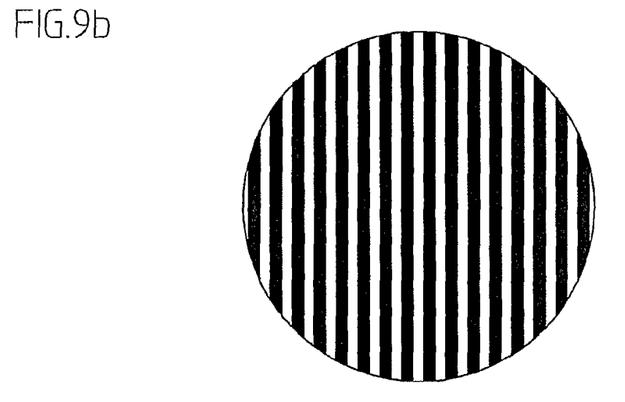
FIGS. 9b and 9c each show a possible fringe pattern, resulting in the detection plane of the device of the prior art, in a tilted state.
Figure 9C:
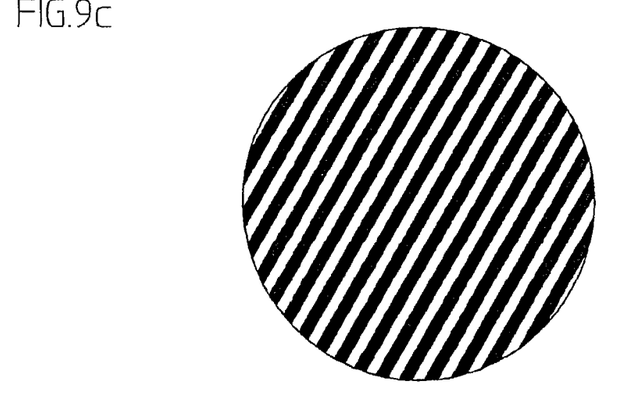

FIGS. 9b and 9c, also in schematic form, now show how this fringe pattern in the detection plane of a device analogous to the prior art varies, if tilting of the reflector and scanning unit results as mentioned above. As FIG. 9b shows, upon slight tilting (1 mrad) about a first axis, the fringe pattern periodicity varies. As FIG. 9c shows, in the event of once again only slight tilting (1 mrad) about a second axis, the orientation of the fringe pattern in the detection plane varies as well. In both cases, the result is the aforementioned erroneous, poor-quality distance signals.

OBJECTS AND SUMMARY OF THE INVENTION

An object of the present invention is to create an interferometric distance measurement device which, even in the event of tilting of the reflector relative to the scanning unit, furnishes maximally correct distance signals of good signal quality.

This object is attained according to the present invention by an interferometric distance measurement device that includes a light source that emits a beam of light and a scanning unit. The scanning unit includes a scanning plate, which includes a splitter that splits the beam of light into at least a measurement beam and a reference beam, wherein the reference beam is propagated solely within the scanning plate before reaching interferential superposition with the measurement beam at a unification site. A reflector is provided that is, spaced apart from the scanning unit, which is acted upon by the measurement beam, wherein the reflector is embodied such that the measurement beam striking the reflector undergoes retroreflection in at least one direction, so that the reference beam and the measurement beam maintain their relative propagation directions, regardless of any possible relative tilting of the scanning unit and of the reflector downstream of the unification site. A detector arrangement is provided by way of which at least one distance signal relating to a distance between the scanning plate and the reflector is detectable from the measurement beam and the reference beam interfering with one another.

According to the present invention, an embodiment of the reflector is now contemplated such that the reflector is embodied such that the measurement beam striking it undergoes retroreflection in at least one direction, so that the reference beam and the measurement beam maintain their relative propagation directions, regardless of any possible relative tilting of the scanning unit and of the reflector downstream of the unification site.

Preferably, the reflector has at least one lens element and one reflector element.

The lens element may have an optical effect such that the measurement beam striking it undergoes focusing onto the reflector element in at least one direction.

It is possible for the lens element to be embodied as a transmitting Fresnel lens.

Preferably, the reflector element is embodied as a reflective layer.

It can be provided that the reflector has at least one lens element and one reflector element, and in the reflector, the lens element is disposed on one side of a transparent carrier substrate, which faces toward the scanning plate, and the reflector element is disposed on the opposite side of the carrier substrate, and the reflective side of the reflector element is oriented in the direction of the lens element.

In one possible embodiment, by way of the dimensioning of the thicknesses of the scanning plate and/or of the reflector and/or by way of the selection of suitable parameters of gratings on the scanning plate, it is ensured that the split measurement and reference beams traverse identical optical path lengths before the re-superposition at the desired spacing of the scanning plate and reflector.

In a further embodiment, the scanning plate can include at least one lens element and one reflector, which are embodied and disposed in the beam paths in such a manner that the reference beam and the measurement beam maintain their relative directions to one another downstream of the unification site, regardless of any tilting of the scanning plate.

It is also possible to embody the splitter such that the measurement and reference beams that are split by way of them have different polarization directions.

The splitter can be embodied as polarizing gratings.

In an advantageous embodiment, it is provided that the splitter and a unification grating are disposed on the top side, remote from the reflector, of the carrier substrate of the scanning plate, and two lens elements and one measurement grating are disposed on the underside, facing toward the reflector, of the carrier substrate of the scanning plate, so that by way of the splitter, the beam emitted by the light source undergoes splitting into one measurement beam and one reference beam, the measurement beam is propagated in the direction of the reflector, there undergoes a back-reflection in the incidence direction, and at the measurement grating undergoes a deflection in the direction of the unification grating, and the reference beam is propagated in the direction of the first lens element and from there is diffracted in the direction of the top side of the carrier substrate of the scanning plate, then from there is reflected in the direction of the second lens element and is diffracted by the second lens element in the direction of the unification grating, and reaches the interferential superposition at the unification site with the measurement beam.

In this respect, it is possible that the scanning plate in the scanning unit is coupled mechanically to an angled mirror assembly including at least two individual plane mirrors, by way of which mirrors a deflection of the beam propagated by the light source in the direction of the scanning unit take place, and by way of which mirrors a deflection of the superimposed measurement and reference beams being propagated in the direction of the detector arrangement takes place, and the beams striking the angled mirror assembly and the beams leaving the angled mirror assembly are each oriented parallel to one another.

It can be provided that the scanning unit is disposed movably relative to a reflector unit in at least one direction, and the reflector, the light source, and the detector arrangement are disposed in the reflector unit.

It is also possible that a measurement grating, a unification grating, and a first reflection grating are disposed on the side of the carrier substrate of the scanning plate facing toward the reflector, and the grating periods of the measurement grating and of the unification grating differ, and the splitter and a second reflection grating are disposed on the side of the carrier substrate of the scanning unit remote from the reflector, so that by way of the splitter, the beam emitted by the light source undergoes splitting into a measurement beam and a reference beam, and the measurement beam is propagated in the direction of the reflector and in the process passes through the measurement grating, is reflected back in the incidence direction at the reflector, and after again passing through the measurement grating is propagated in the direction of the unification grating, and in the scanning plate the reference beam is propagated via the first and second reflection gratings in the direction of the unification grating and reaches the interferential superposition at the unification site with the measurement beam.

It is moreover possible for the detector arrangement to be embodied as a structured photodetector, which includes a plurality of periodically disposed detector elements.

With regard to the provisions according to the invention, it can be said to be especially advantageous that because of the how the reflector is embodied, any tilting of the reflector and scanning plate no longer causes any erroneous measurements. Even in the tilted state, correct distance signals with a high degree of modulation ensue.

Also with the device of the present invention, the wavelength dependency of the distance signals generated can be minimized. This is ensured by a suitable dimensioning of the thicknesses of the scanning plate and the reflector and by way of the selection of suitable parameters of the various gratings on the scanning plate. As a result, at the desired spacing of the scanning plate and the reflector, the optical path lengths of the measurement and reference beams that attain interference are equal.

Further details and advantages of the present invention will now be explained in the ensuing description of exemplary embodiments of the device of the present invention, in conjunction with the drawings.

DETAILED DESCRIPTION OF THE PREFERRED EMBODIMENTS

Below, in conjunction with the various drawings, two concrete embodiments of the device of the present invention for interferometric distance measurement device will be described in detail. The two embodiments represent two different concepts for the possible disposition of the components that are movable, or tiltable, relative to one another. In the first exemplary embodiment, a light source, a detector arrangement, and a reflector are disposed in a reflector unit movably relative to a scanning unit. In the second exemplary embodiment, conversely, a light source, a detector arrangement and a scanning plate are disposed in a scanning unit movably relative to a reflector.

First, the fundamental principles common to the two exemplary embodiments will be described below, namely in particular the contemplated retroreflective properties of the reflector and the path-length-compensated beam guidance of the reference beam.

In detail, the interferometric distance measurement of the present invention includes a light source; a scanning unit with a scanning plate, which has a splitter that splits the fringe pattern emitted by the light source into at least one measurement beam and at least one reference beam; a reflector that is spaced apart from the scanning unit; and a detector arrangement. After the splitting, the reference beam is propagated solely within the scanning plate; the measurement beam acts on the reflector and is back-reflected from it in the direction of the scanning unit and at a unification site is reunited with the reference beam and brought into interferential superposition. Via the detector arrangement, at least one distance signal pertaining to the distance between the scanning plate or the scanning unit and the reflector can be detected from the measurement and reference beams that are made to interfere with one another.

Besides the scanning plate, still other elements can be disposed in the scanning unit; it can also be provided for instance that the reflector is accommodated together with further components in a reflector unit. Then the scanning unit and the reflector unit are disposed movably relative to one another.

With the aid of the device of the present invention, the distance, or a change in the distance, between the scanning plate or the scanning unit and the components disposed therein, on the one hand, and the reflector or the reflector unit, on the other hand, can be ascertained with high precision via an interferential distance measurement.

What is definitive for the present invention is an embodiment of the reflector, which reflects the measurement beam back in the direction of the scanning unit. Thus, the reflector is embodied such that the measurement beam striking it undergoes retroreflection in at least one direction, thus ensuring that the measurement beam reflected by the reflector is always oriented parallel to the measurement beam striking the reflector, regardless of any tilting of the reflector in the at least one direction.

As for the concrete embodiment of the reflector, various possibilities exist. In the event of retroreflection provided in only one direction, as in the first exemplary embodiment that follows, the reflector can include a combination of a lens element in the form of a cylindrical Fresnel lens and a reflector element in the form of a plane reflective layer. Alternatively, however, a roof prism would also be suitable as a reflector. In the event of the resultant retroreflection in two directions, it can be provided in accordance with the second exemplary embodiment that follows that the reflector includes a combination of a lens element in the form of a rotationally symmetrical Fresnel lens and a reflector element in the form of a plane reflective layer; alternatively, a triple prism or a triple mirror could also be used as the reflector.

For the interferential distance measurement, it is ensured, on the one hand, by way of the disposition and/or embodiment of the various components of the scanning unit that the measurement beam is propagated in the direction of the reflector and is reflected back again by it in the direction of the scanning unit. On the other hand, via the embodiment of the scanning unit, it is ensured that the reference beam, after the splitting has been done, is propagated solely within the scanning plate before being brought into interferential superposition with the measurement beam, reflected back from the reflector, at a unification site in the scanning unit.

Via the detector arrangement, an interferential distance signal can be detected in the scanning unit. The interferential distance signal results from different optical path lengths that are traversed by the measurement and reference beams.

The interferential distance signal thus obtained is a standard for possible resultant changes in distance between the components that are movable relative to one another. In the simplest embodiment, the device embodied according to the present invention thus functions as a relative measurement system. Because the distance measurement according to the invention is fundamentally independent of wavelength at the desired distance, it is naturally also possible to expand the device of the invention into an absolute measurement system, for instance by making such interferential distance measurements at different light wavelengths and evaluating these measurements by what is known as the Nonius principle to determine an absolute distance between the scanning unit and the reflector.

In a relative measurement, in order also to have information available about the direction of the change in distance that is occurring, it is fundamentally necessary to generate a plurality of phase-shifted distance signals. For instance, three distance signals phase-shifted by 120° each, or four distance signals phase-shifted by 90°, can be generated. For generating phase-shifted distance signals, various possibilities are basically available. The two exemplary embodiments of the device of the present invention described in detail below differ not only in the different disposition of the various components, as mentioned above, but also in the manner in which the phase-shifted distance signals are generated.

As already indicated above, it is also possible via the device of the present invention to minimize the wavelength dependence of the distance signals generated. This is accomplished by suitable dimensioning of the thicknesses of the scanning plate and/or reflector and/or via the selection of suitable parameters of the various gratings on the scanning plate for a particular desired spacing. In principle, it must be ensured that by suitable beam guidance of the split measurement and reference beams, the optical paths traversed from the splitting until the reunification at the desired distance between the scanning plate and the reflector are of equal length.

Figure 1:
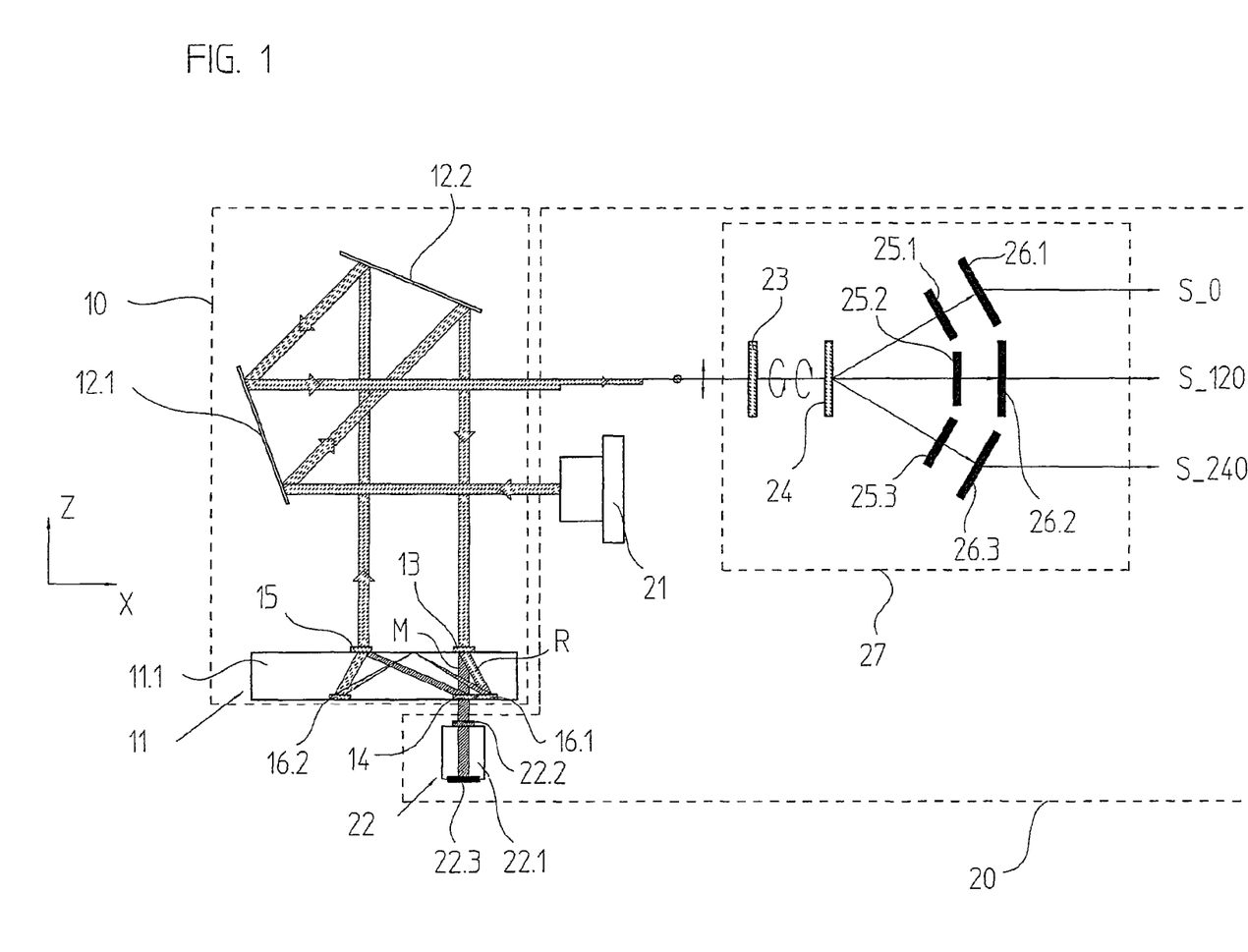
FIG. 1 is a schematic illustration of a first embodiment of a device in accordance with the present invention.

In conjunction with FIGS. 1, 2a, 2b, 3a and 3b, a first embodiment of the device of the present invention which utilizes a polarization-optical variant to generate phase-shifted distance signals will now be explained. FIG. 1 schematically shows the scanning beam paths used for the distance measurement; the other drawings show various views of components of the first embodiment of the device of the present invention.

The first exemplary embodiment of a device of an interferometric distance measurement of the present invention shown in these drawings includes a scanning unit 10 with a number of components disposed in it, and a reflector 22 spaced apart from it in the Z direction indicated. The reflector 22, in this embodiment, is disposed in a reflector unit 20, which contains not only the reflector 22 but also a number of other function-relevant elements. The scanning unit 10 and the reflector unit 20 are disposed movably counter to one another in the Z direction and are connected for instance to machine components—not shown—that are relatively movable in at least that direction.

Essentially, a scanning plate 11 and an angled mirror assembly with two individual plane mirrors 12.1, 12.2 are also disposed in the scanning unit 10. That is, the scanning plate 11 is mechanically coupled in the scanning unit 10 to the angled mirror assembly. The scanning plate 11 includes a transparent glass plate 11.1, on both the top and undersides of which a number of function-relevant optical elements are placed that are acted upon by the various beams that are involved in the signal generation.

A splitter 13 and a unification grating 15, for instance, are disposed on the top side of the scanning plate 11, or in other words on the side of the scanning plate 11 remote from the reflector 22. In the present exemplary embodiment, the splitter 13 is embodied as transmission-diffraction gratings in the form of a polarizing grating with the grating period $TP_A$=1.25 µm. The unification grating 15 is also embodied as a transmission-diffraction grating and has a grating period $TP_V$=1.25 µm. The various gratings on the top side of the scanning plate 11 may be embodied as phase gratings, amplitude gratings, or combined phase/amplitude gratings.

Figure 3A:
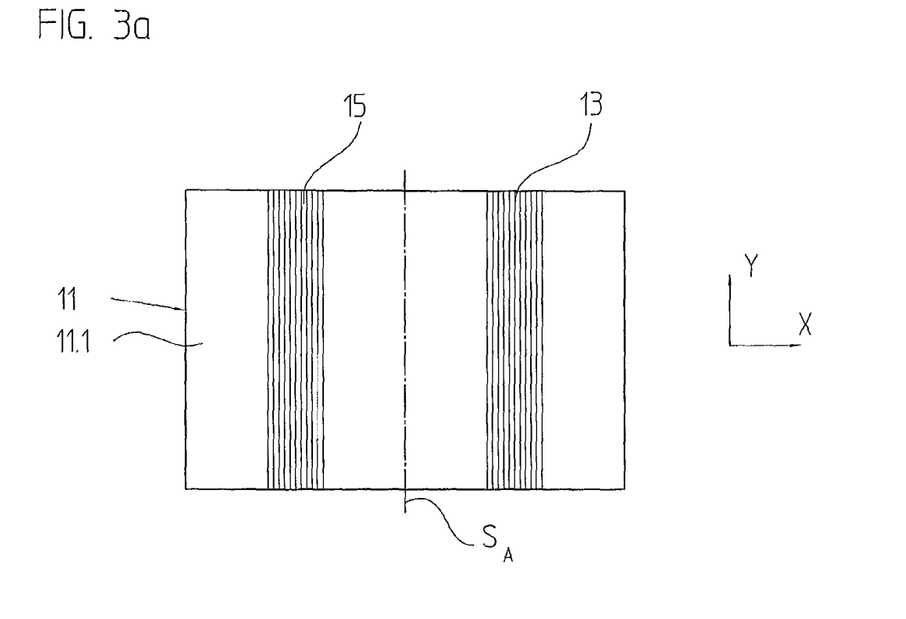
FIG. 3a is a view of the top side of an embodiment of a scanning plate of the device of FIG. 1 in accordance with the present invention.
Figure 3B:
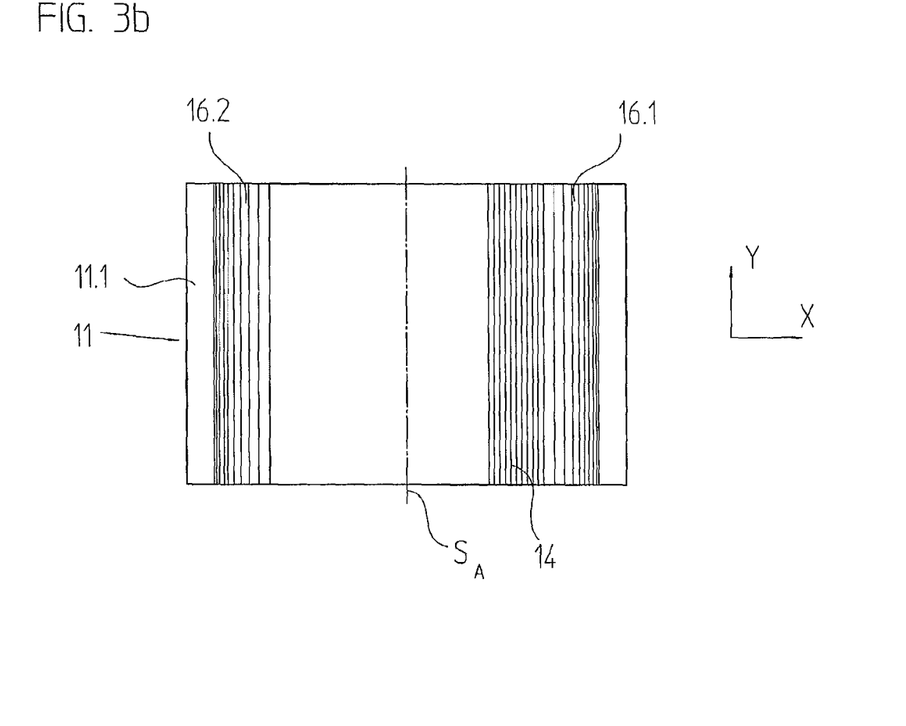
FIG. 3b is a view of the underside of an embodiment of the scanning plate of FIG. 3a of the device of FIG. 1.

Two lens elements 16.1, 16.2 and one measurement grating 14 are disposed on the underside of the scanning plate 11, that is, on the side of the scanning plate 11 facing toward the reflector 22. The measurement grating 14 is embodied as a transmission-diffraction grating and has the grating period $TP_M$=0.44 µm, which is constant over the grating length in the X direction. The lens elements 16.1, 16.2 in the present exemplary embodiment are embodied as reflective cylindrical Fresnel lenses. The lens element 16.1 effects linear focusing of the beam striking it onto the top side of the scanning plate 11, while the lens element 16.2 effects a recollimation of the beam striking it from the top side of the scanning plate 11. As can be seen from the view of the underside of the scanning plate 11 in FIG. 3b, the lens elements 16.1, 16.2 or in other words the corresponding reflective cylindrical Fresnel lenses are embodied as reflective phase gratings. The resultant reflective effect here is in the direction of the top side of the scanning plate. The grating regions of the lens elements 16.1, 16.2 extend in the indicated Y direction across the underside of the scanning plate 11, and the grating period becomes greater in each case from the outside inward; the lens elements 16.1, 16.2 are embodied mirror-symmetrically to an axis of symmetry $S_A$, as shown in FIG. 3a-b. Because of this embodiment of the lens elements 16.1, 16.2, an optical imaging effect on the beams striking them is exerted by these elements only in the indicated X direction, but not in the Y direction oriented perpendicular to it.

In the reflector unit 20, among other elements the reflector 22 already mentioned above is provided. In this exemplary embodiment, the reflector 22 includes a transparent carrier substrate 22.1, on the top side of which, facing toward the scanning plate 11, is a lens element 22.2, and on the underside of which, that is, on the opposite side, is a reflector element 22.3. The reflector element 22.3 is embodied as a reflective layer, whose reflective side is oriented in the direction of the lens element 22.2 on the top side of the carrier substrate 22.1. The lens element 22.2 is embodied as a phase divider in the form of a transmitting cylindrical Fresnel lens, and it exerts an optical effect on the beam striking it such that by way of this, the beam is focused on the reflector element 22.3. As can be seen from the views of the reflector cross section in FIG. 1 (X-Z plane) and in FIG. 2a (Y-Z plane), and in the plan view on the top side of the reflector in FIG. 2b, what is effected via the lens element 22.2 of this exemplary embodiment is that the beam striking it is focused in only one direction, namely the Y direction indicated. In the X direction oriented perpendicular to the Y direction, the lens element 22.2 has no optical effect on the beam striking it. When the beam reflected by the reflector element 22.3 passes through the lens element 22.2 again, the beam is recollimated by this lens element again before being propagated back in the direction of the scanning unit 10.

Figure 2A:
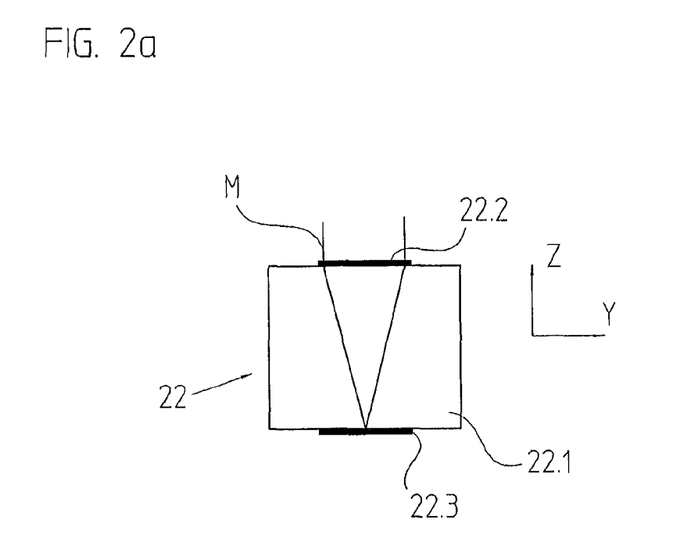
FIG. 2a is a view in the X-Y direction of an embodiment of a reflector of the device in accordance with the first exemplary embodiment in FIG. 1.
Figure 2B:
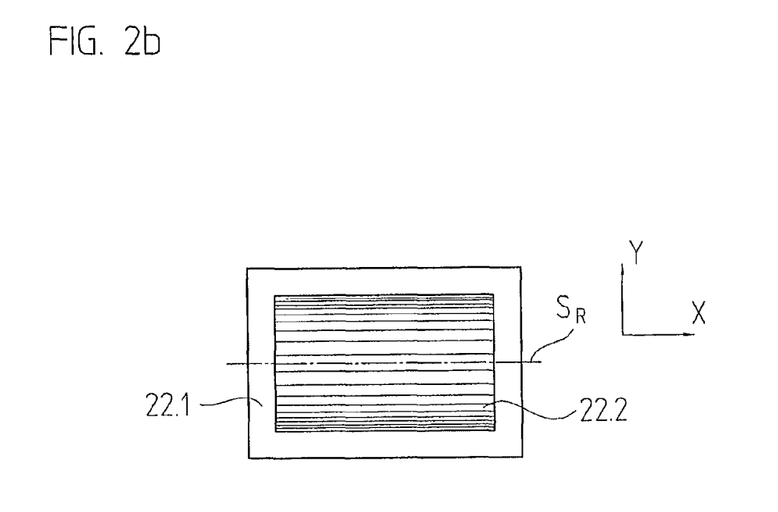
FIG. 2b is a plan view on the top side of the reflector of FIG. 2a of the device of FIG. 1.

The lens element 22.2 on the carrier substrate 22.1, disposed on the top side of the reflector 22 in FIG. 2b, is embodied as a transmitting phase divider in the form of a transmitting cylindrical Fresnel lens. The grating regions of the lens element 22.2 extend here in the Y direction indicated across the top side of the carrier substrate 22.1, and the grating period increases from the outside inward in each case; the lens element 22.2 is embodied mirror-symmetrically to an axis of symmetry $S_R$.

A light source 21 and a detector arrangement 27 are also disposed in the reflector unit 20. In the present embodiment, the detector arrangement for detecting the phase-shifted distance signals S_0, S_120, S_240 includes a λ/4 plate 23, a splitter grating 24, three linear polarization filters 25.1, 25.2, 25.3, and three optoelectronic detector elements 26.1, 26.2, 26.3.

The beam path for generating the three phase-shifted distance signals S_0, S_120, S_240 will now be explained. The fringe pattern emitted by the light source 21, after deflection via the two plane mirrors 12.1, 12.2 of the angled mirror assembly in the scanning unit 10, strikes the splitter 13. Via the splitter 13, the beam striking the splitter 13 is split into one measurement beam M and one reference beam R. The splitter 13, as already noted above, is embodied as transmission-diffraction gratings, and they split the incident beam into partial beams of both $0^{th}$ and $\pm 1^{st}$ diffraction orders. Of the beams that are split, only the $0^{th}$ diffraction order beam is used as the measurement beam M, and only the $+1^{st}$ diffraction order beam is used as the reference beam R for signal generation.

The splitter 13 in the present exemplary embodiment is also embodied as a polarizing grating, so that the measurement and reference beams M, R split thereby are polarized orthogonally to one another. That is, the polarization vectors of the reference beam R on the one hand and of the measurement beam M on the other are oriented perpendicular to one another. This is significant for the generation, to be described in further detail below, of the phase-shifted distance signals S_0, S_120, S_240. To that end, the corresponding polarizing grating has suitably dimensioned grating parameters. For information on such polarizing gratings, see for example the article "Gratings in the resonance domain as polarizing beam splitters" by M. Schmitz, R. Bräuer, and O. Bryngdahl, in OPTICS LETTERS, Vol. 20, No. 17, p. 1830 (1995).

The reference beam R separated via the splitter 13 then strikes the lens element 16.1 on the underside of the scanning plate 11 and is reflected by the lens element in the direction of the top side of the scanning plate 11. Because of the previously mentioned optical effect of the lens element 16.1, the reference beam R is focused onto the top side of the scanning plate 11. From there, the reference beam R is reflected back in the direction of the underside of the scanning plate 11 in total reflection onto the second lens element 16.2. Naturally, as an alternative to the total reflection, it can also be provided that a suitable reflector element is disposed on the top side of the scanning plate 11, in order to deflect the reference beam R in a suitable manner. The only definitive factor at this point is that the top side of the scanning plate 11, at the site where the reference beam R strikes it, functions as a reflector for the reference beam R. The second lens element 16.2 then diffracts the incident reference beam R back in the direction of the top side of the scanning plate 11, namely onto the unification grating 15 disposed there. Because of the embodiment of the lens element 16.2, is a recollimation of the reference beam R that has been propagated in the direction of the unification grating 15 occurs. After the splitting of the beam striking from the direction of the light source 21, the reference beam R is thus propagated, as far as the unification grating 15, solely within the scanning plate 11.

The measurement beam M is not deflected via the splitter 13, and in the scanning plate 11 it first strikes the measurement grating 14 disposed on the underside, then passes through the measurement grating and is propagated in the direction of the reflector 22. In the reflector 22, via the lens element 22.2 on the top side of the carrier substrate 22.1, the measurement beam M is focused onto the reflector element 22.3 on the underside of the carrier substrate. Note that the lens element 22.2, embodied as a transmitting Fresnel lens, has a focal length that is approximately equivalent to the thickness of the carrier substrate 22.1 of the reflector 22. From the reflector element 22.3, a back-reflection of the measurement beam M in the direction of the scanning unit 10 takes place. After passing through the lens element again and after the resultant recollimation, the measurement beam M reaches the measurement grating 14 on the underside of the scanning plate 11 again. At the measurement grating 14, the measurement beam M undergoes a $+1^{st}$ order of diffraction and is deflected in the direction of the unification grating 15 on the top side of the scanning plate 11.

At the unification grating 15, that is, at the unification site, the measurement beam M and the reference beam R, after traversing their respective optical paths, again reach interferential superposition. The various refractive and diffractive deflection elements along the optical paths traversed can be embodied such that at the unification site, it is largely orthogonally polarized beams that interfere. Finally, from the unification grating 15, interfering pairs of diffracted measurement and reference beams are propagated in various directions in space. For signal recovery via the downstream detector arrangement 27 in the present exemplary embodiment, however, only that pair of interfering beams that is propagated onward perpendicularly relative to the unification grating is used. Before the interfering beams polarized perpendicularly to one another arrive at the detector arrangement 27, a further deflection takes place via the two plane mirrors 12.1, 12.2 of the angled mirror assembly in the scanning unit 10, such that these beams leaving the angled mirror assembly are parallel to the beam originally striking it.

In the detector arrangement 27, the pair of interfering beams first passes through a λ/4 plate 23, which is disposed at a 45° angle from the polarization directions of the beams polarized perpendicularly to one another. Via the λ/4 plate 23, the two beams polarized linearly and orthogonally to one another are converted into beams that are differently polarized circularly. From the superposition of these two circularly polarized beams, the result is finally a linearly polarized beam the polarization direction of which depends on the phase relationship of the differently circularly polarized beams.

Next, the linearly polarized beam reaches a splitter grating 24. The splitter grating 24 splits the beam striking it into three orders of diffraction that are of equal intensity to one another. The detector elements 26.1, 26.2, 26.3, including preceding linear polarization filters 25.1, 25.2, 25.3, are then disposed in the directions in space of the split beams having the three orders of diffraction. The three polarization filters 25.1, 25.2, 25.3 are oriented differently from one another. Thus in the present exemplary embodiment they have a relative orientation of −60°, 0°, and +60° relative to one another. At the detector elements 26.1, 26.2, 26.3, three distance signals S_0, S_120, S_240 phase-shifted by 120° relative to one another are then detectable.

In connection with the polarization-optical generation of the phase-shifted distance signals, it should also be pointed out that it is naturally also possible to establish other phase relationships among the distance signals. For instance, four distance signals phase-shifted by 90° relative to one another can be generated. To that end, four detector elements are each disposed downstream of the splitter grating 24 and are each rotated by 45° from one another.

The first exemplary embodiment of the interferometric distance measurement of the present invention is suitable for ranges of the distance to be measured of several hundred micrometers. A variant with a markedly larger measurement range will be described below.

In conjunction with FIGS. 4, 5a, 5b, 6a, 6b, 7, 8a, 8b, and 8c, a second embodiment of the device of the present invention will now be described, which among other differences uses a different principle for generating phase-shifted distance signals as well as a different reflector. FIG. 4, again in schematic form, shows the scanning beam paths used for distance measurement. FIGS. 5a-7 show various views of components of the second embodiment of the device of the present invention. FIGS. 8a-8c show the resultant fringe pattern in the detection plane in the event of various tilting states of the scanning unit and reflector.

Figure 4:
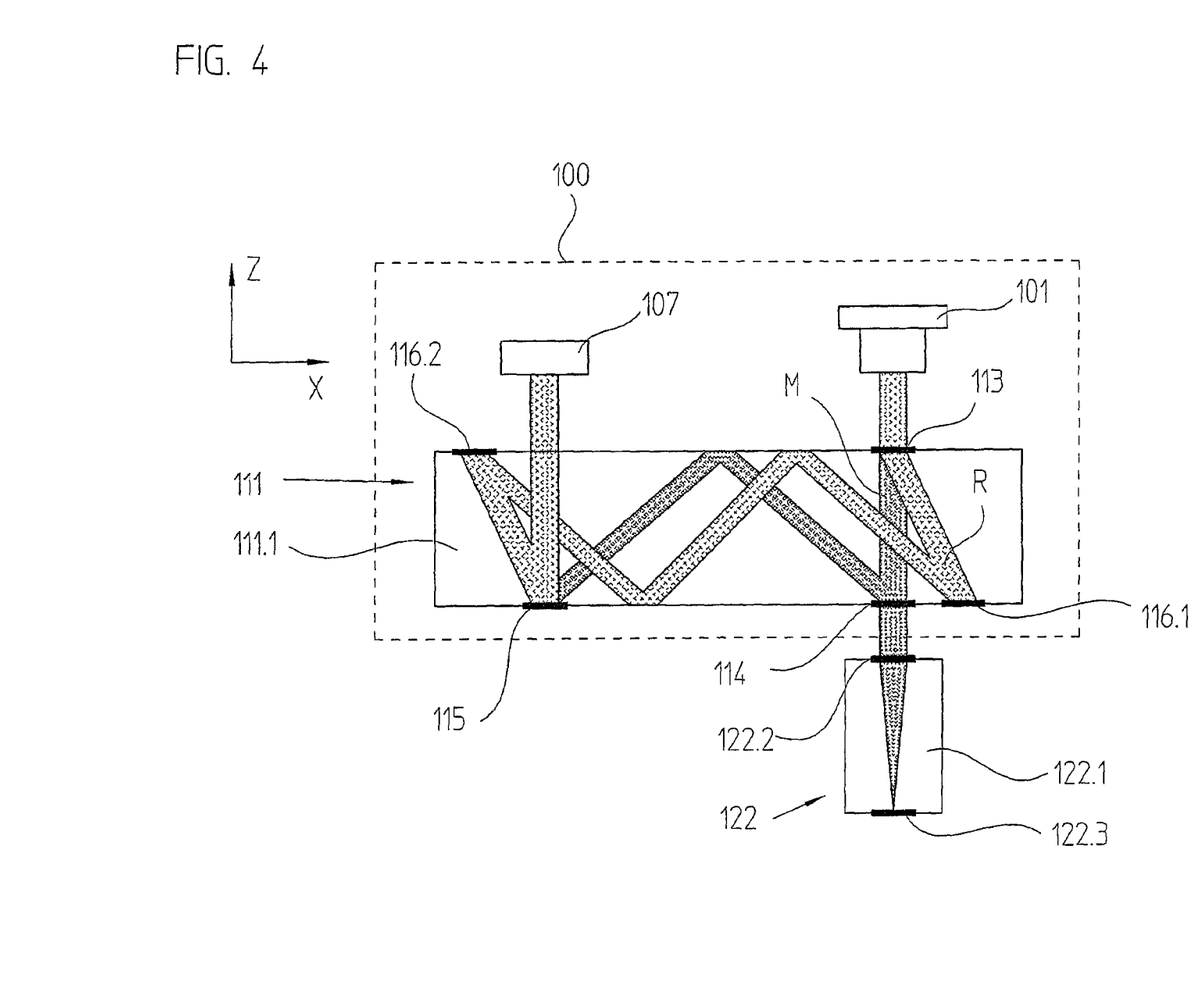
FIG. 4 is a schematic illustration of a second embodiment of a device in accordance with the present invention.
Figure 5A:
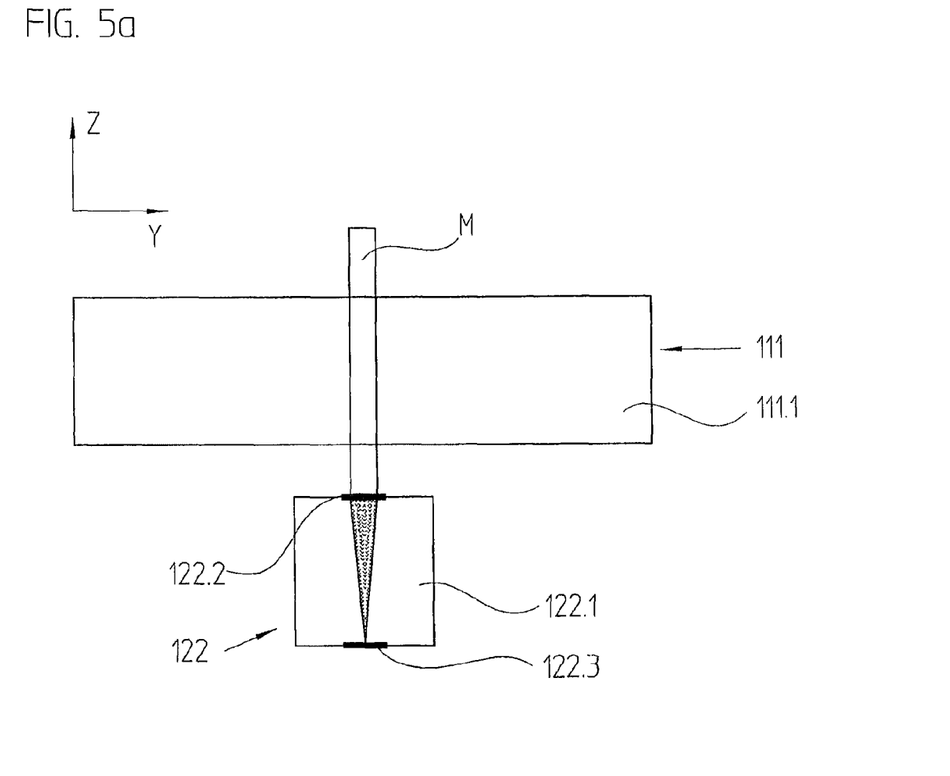
FIG. 5a is a view in the X-Y direction of an embodiment of a reflector of the device in accordance with the second exemplary embodiment in FIG. 4 in accordance with the present invention.
Figure 5B:
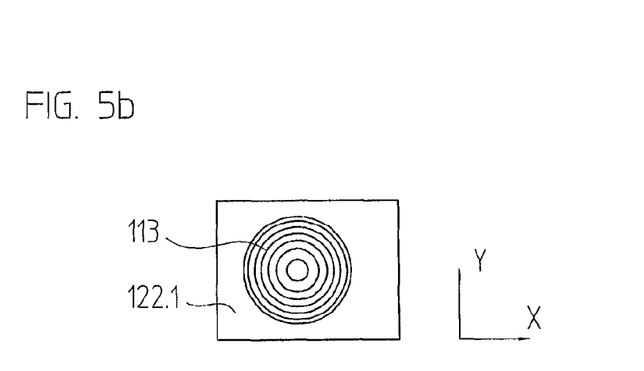
FIG. 5b is a plan view on the top side of the reflector of FIG. 5a of the device of FIG. 4.
Figure 6A:
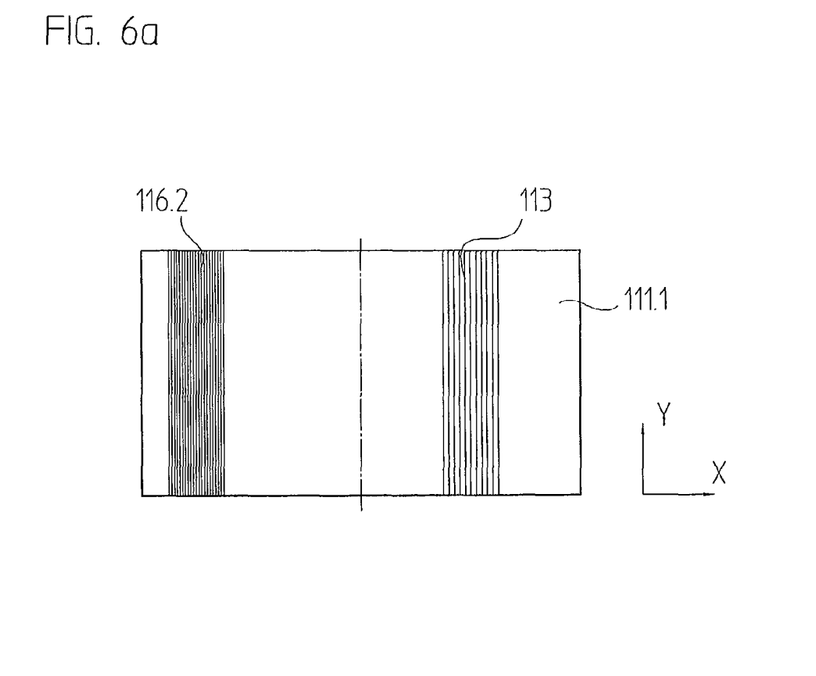
FIG. 6a is a view of the top side of an embodiment of a scanning plate of the device of FIG. 4 in accordance with the present invention.
Figure 6B:
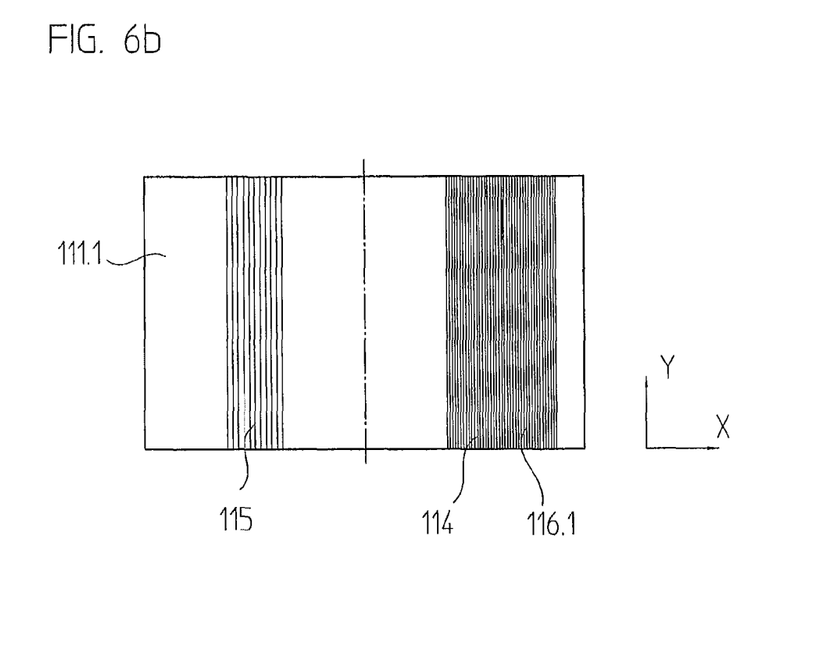
FIG. 6b is a view of the underside of the scanning plate of FIG. 6a of the device of FIG. 4.

The second embodiment of the device of the present invention shown in these drawings includes both a scanning unit 100 and a reflector 122, the distance between which is to be determined. In a distinction from the first exemplary embodiment, not only the scanning plate 111 but also the light source 101 and the detector arrangement 107 are disposed in the scanning unit 100. The scanning plate 111 also differs from that in the exemplary embodiment described above. As shown in FIGS. 4 and 6b, the underside of the glass plate 111.1 that faces toward the reflector 122 includes a first reflection grating 116.1, a measurement grating 114, and a unification grating 115. As can be seen from FIG. 6a, the splitter 113 and a second reflection grating 116.2 are disposed on the top side of the scanning plate 111.

The splitter 113 is embodied as transmission-diffraction gratings with the grating period $TP_A$, which splits the beam, striking it from the light source 101, into one measurement beam M and one reference beam R. As in the first exemplary embodiment, the $0^{th}$ diffraction order beam is used as the measurement beam M, and the $+1^{st}$ diffraction order beam is used as the reference beam R. However, in this exemplary embodiment, the splitter 113 does not have a polarization-optical effect.

The reflection gratings 116.1, 116.2 also provided on the scanning plate 111 exert only a reflective effect on the beams striking them. As with the embodiment of FIG. 1, the reference beam R is propagated only within the scanning plate 111. The reflection gratings 116.1, 116.2 are preferably embodied as phase gratings.

The reflector 122, as in the first exemplary embodiment of FIG. 1, again includes a carrier substrate 122.1, on the top side of which, facing toward the scanning unit 100, a lens element 122.2 is disposed. On the underside, that is, on the opposite side of the carrier substrate 122.1, a reflector element 122.3 is again disposed, whose reflective side is oriented in the direction of the lens element 122.2. In a distinction from the previous example, the lens element 122.2 of the reflector 122 is now embodied as an annular, or in other words rotationally symmetrical, transmitting Fresnel lens, which first focuses the measurement beam M striking it onto the reflector element 122.3 and as the measurement beam M passes through it again then recollimates it again. As can be seen from the views in FIGS. 4 and 5a, via the lens element 122.2 embodied in this way, a focusing optical effect is thus exerted on the measurement beam M in both directions in space X, Y.

The beam striking the splitter 113 from the light source 101 is, as already mentioned, split into a measurement beam M and a reference beam R.

From where the splitting occurs to where it is reunited with the measurement beam M, the reference beam R is again propagated solely in the scanning plate 111. In the process, it first reaches the first reflection grating 116.1 on the underside of the scanning plate 111, and from there it is reflected in the direction of the top side of the scanning plate 111. The result on the top side of the scanning plate 111 is a first reflection in the direction of the underside, where a second reflection of the reference beam R takes place in the direction of the top side of the scanning plate 111, or in other words in the direction of the second reflection grating 116.2. From the second reflection grating 116.2, finally, the reference beam R is reflected in the direction of the unification grating 115 on the underside of the scanning plate 111.

The measurement beam M resulting after the splitting by splitter 113 first passes through the measurement grating 114 on the underside of the scanning plate 111 and is propagated in the direction of the reflector 122. There, it is focused by the lens element 122.2 onto the reflector element 122.3. After the back-reflection from the reflector element 122.3, the lens element 122.2 exerts a recollimating effect on the measurement beam M being propagated in the direction of the scanning unit 100. After the measurement beam M has again passed through the measurement grating 114 and been deflected in the direction of the top side of the scanning plate 111, the measurement beam M is reflected in the direction of the unification grating 115, where it enters into interferential superposition with the reference beam R. The superimposed beams then emerge at a right angle from the scanning plate 111 and are propagated in the direction of the detector arrangement 107, by way of which the phase-shifted distance signals S1_0, S1_90, S1_180, S1_270 are detected.

Figure 7:
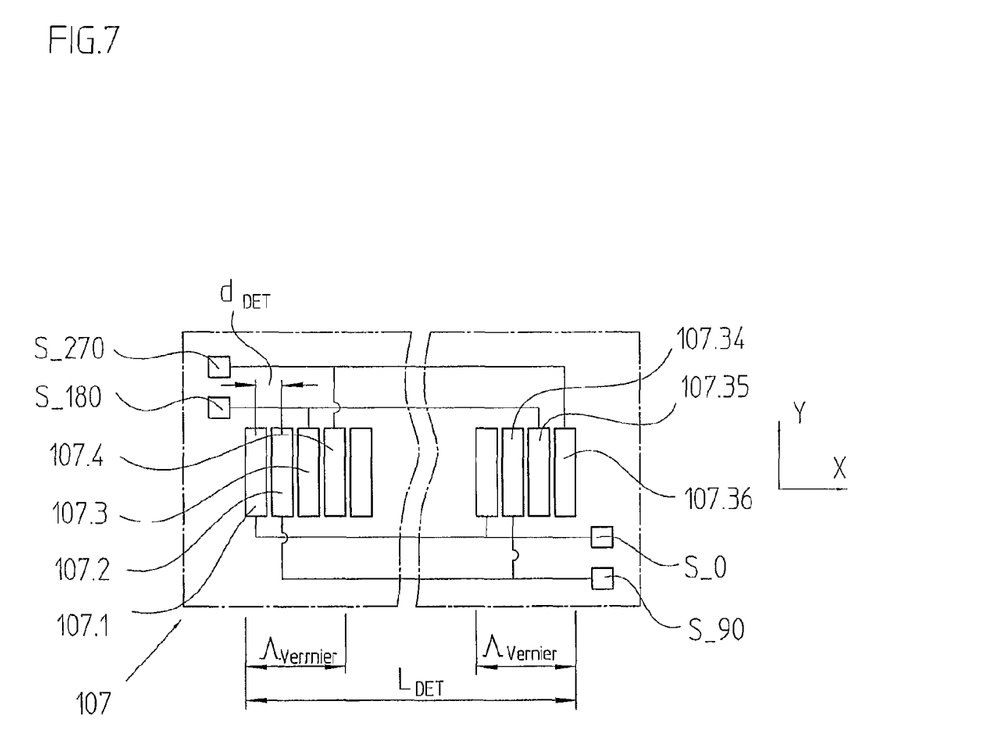
FIG. 7 is a view of an embodiment of a detector arrangement of the device of FIG. 4 in accordance with the present invention.
Figure 8A:
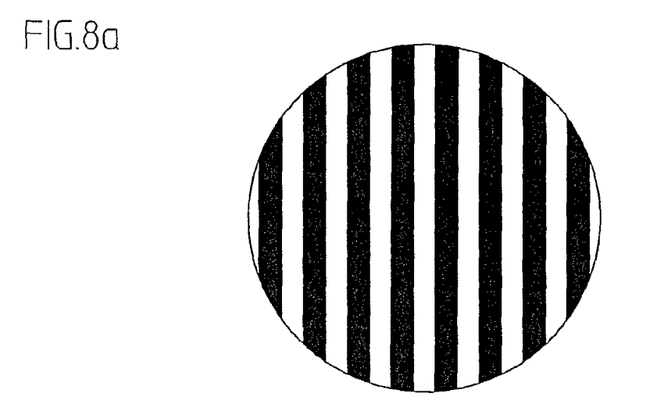
FIG. 8a is an illustration of a possible fringe pattern, resulting in the detection plane of the device of FIG. 4, in an untilted state.
Figure 8B:
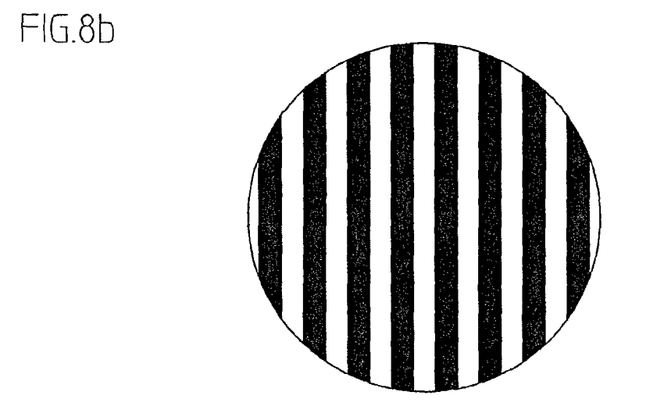
FIGS. 8b and 8c each show a possible fringe pattern, resulting in the detection plane of the device of FIG. 4, in a tilted state.
Figure 8C:
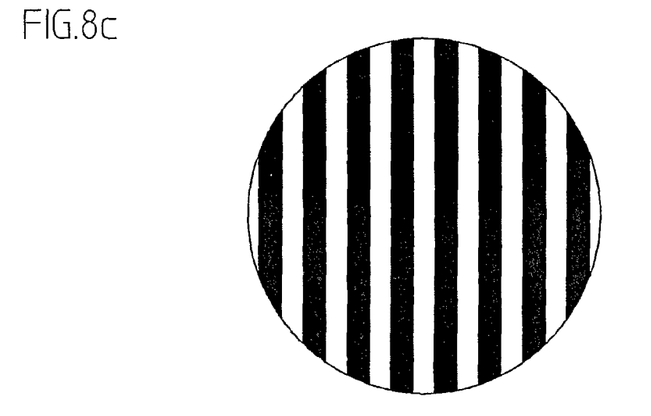

A view of the detection plane of the detector arrangement 107 is shown in FIG. 7. There, a so-called structured photodetector in the detector arrangement 107 is used, including a plurality of periodically disposed detector elements 107.1, . . . , 107.36. Of these detector elements 107.1, . . . , 107.36, those that furnish identical-phase distance signals S1_0, S1_90, S1_180, S1_270 are interconnected.

Besides the distinctions from the first exemplary embodiment of FIG. 1 that have already been explained, a further distinction is the manner in which the phase-shifted distance signals S1_0, S1_90, S1_180, S1_270 are generated. Unlike in the first variant, it is now provided that a periodic fringe pattern in the detection plane of the detector arrangement 107 is generated on the basis of what is known as the Vernier principle; the corresponding fringe pattern will therefore hereinafter also be called a Vernier fringe pattern. If a change in the distance between the scanning unit 100 and the reflector 122 occurs, the Vernier fringe pattern generated migrates across the detector elements 107.1, . . . , 107.36 of the structured photodetector.

In the present example, four detector elements 107.1, . . . , 107.36 are each disposed within a period $\Lambda_{Vernier}$ of the Vernier fringe pattern generated. The result on the output end is thus four periodic distance signals S1_0, S1_90, S1_180, S1_270 each, phase-shifted by 90° each from one another, which can be further processed in a known manner.

What is definitive for the embodiment of the Vernier fringe pattern in the detection plane, in this variant of the device of the present invention, is that in particular the grating period $TP_V$ of the unification grating 115 is slightly different from twice the grating period $TP_M$ of the measurement grating 114.

By the suitable selection of the various grating periods $TP_M$, $TP_V$, it is possible in a fundamentally known manner to adjust the periodicity $\Lambda_{Vernier}$ of the Vernier fringe pattern generated in the detection plane.

Typical numerical values for a concrete exemplary embodiment in the second variant described, which is independent of wavelength, are approximately as follows:
Thickness of the glass plate 111.1 (scanning plate): 10 mm
Thickness of the carrier substrate 122.1 (reflector): 10 mm
Distance between reflector 122 and scanning plate 111: 3.3 mm
Grating period of the splitter 113: $TP_A$=1.3765 µm
Grating period of the measurement grating 114: $TP_M$=0.6883 µm
Grating period of the reflection gratings 116.1, 116.2: $TP_R$=0.473 µm
Grating period of the unification grating 115: $TP_V$=1.3793 µm
Periodicity of the Vernier fringe pattern in the detection plane (periodicity of the structured photodetector): $\Lambda_{Vernier} \approx 230$ µm FIG. 8a shows the fringe pattern resulting in the detection plane of a device of the invention in the untilted state. FIGS. 8a and 8c show that because of provisions made according to the present invention, the fringe pattern in the detection plane does not vary even if tilting of the reflector 122 and of the scanning unit 100 occurs. As FIG. 8b shows, upon tilting about a first axis, the fringe pattern periodicity varies just as little as does the fringe pattern orientation in the event of tilting about a second axis in FIG. 8c. Even in both of these cases, the result is high-precision, error-free distance signals with a high degree of modulation and high signal amplitude.

As already explained at the outset, FIGS. 9a-9c in comparison show the corresponding fringe patterns in devices of the prior art, or in other words in devices that do not have the provisions according to the present invention.

It is understood that besides the exemplary embodiments described concretely here, still other embodiment possibilities exist within the scope of the present invention.

For instance, it would also be conceivable to generate phase-shifted distance signals via a third variant, namely by way of the dimensioning of a suitable unification grating, etc.

The foregoing description is provided to illustrate the present invention, and is not to be construed as a limitation. Numerous additions, substitutions and other changes can be made to the invention without departing from its scope as set forth in the appended claims.

We claim:

1. An interferometric distance measurement device, comprising:
 a light source that emits a beam of light;
 a scanning unit comprising a scanning plate, which includes a splitter that splits the beam of light into at least a measurement beam and a reference beam, wherein said reference beam is propagated solely within said scanning plate before reaching interferential superposition with said measurement beam at a unification site;
 a reflector, spaced apart from said scanning unit, which is acted upon by said measurement beam, wherein said reflector is embodied such that said measurement beam striking said reflector undergoes retroreflection in at least one direction, so that said reference beam and said measurement beam maintain their relative propagation directions, regardless of any possible relative tilting of said scanning unit and of said reflector downstream of said unification site, wherein said reflector comprises a lens element and a reflector element, and in said reflector said lens element is disposed on one side of a transparent carrier substrate, which faces toward said scanning plate, and wherein said reflector element is disposed on an opposite side of said transparent carrier substrate, and a reflective side of said reflector element is oriented in a direction of said lens element; and a detector arrangement by way of which at least one distance signal relating to a distance between said scanning plate and said reflector is detectable from said measurement beam and said reference beam interfering with one another.

2. The device as defined by claim 1, wherein said lens element has an optical effect such that said measurement beam striking said lens element undergoes focusing onto said reflector element in at least one direction.

3. The device as defined by claim 2, wherein said lens element is a transmitting Fresnel lens.

4. The device as defined by claim 1, wherein said reflector element is embodied as a reflective layer.

5. The device as defined by claim 1, wherein by way of at least one of: 1) dimensioning at least one of a thickness of said scanning plate and a thickness of said reflector and 2) selecting suitable parameters of gratings on said scanning plate, it is ensured that said split measurement and reference beams traverse identical optical path lengths before re-superposition at a desired spacing of said scanning plate and said reflector.

6. The device as defined by claim 1, wherein said scanning plate comprises a lens element and a reflector, which are embodied and disposed in beam paths in such a manner that said reference beam and said measurement beam maintain their relative directions to one another downstream of said unification site regardless of any tilting of said scanning plate.

7. The device as defined by claim 1, wherein said splitter is embodied such that said measurement beam and said reference beam split by way of said splitter have different polarization directions.

8. The device as defined by claim 7, wherein said splitter is a polarization grating.

9. The device as defined by claim 7, wherein said splitter and a unification grating are disposed on a top side, remote from said reflector, of a carrier substrate of said scanning plate, and a first lens element, a second lens element and a measurement grating are disposed on an underside, facing toward said reflector, of said carrier substrate of said scanning plate, so that by way of said splitter, said beam of light emitted by said light source undergoes splitting into a measurement beam and a reference beam, said measurement beam is propagated in a direction of said reflector, there undergoes a back-reflection in an incidence direction, and at said measurement grating undergoes a deflection in a direction of said unification grating, and said reference beam is propagated in a direction of said first lens element disposed on said underside of said carrier substrate and from there is diffracted in a direction of a top side of said carrier substrate of said scanning plate, then from there is reflected in a direction of said second lens element disposed on said underside of said carrier substrate and is diffracted by said second lens element disposed on said underside of said carrier substrate in said direction of said unification grating, and reaches said interferential superposition at said unification site with said measurement beam.

10. The device as defined by claim 7, wherein said scanning plate in said scanning unit is coupled mechanically to an angled mirror assembly comprising two individual plane mirrors, by way of said two individual plane mirrors, a deflection of said beam of light in a direction of said scanning unit take place, and by way of which said two individual plane mirrors, a deflection of said superimposed measurement and said reference beam being propagated in a direction of said detector arrangement takes place, and beams striking said angled mirror assembly and beams leaving said angled mirror assembly are each oriented parallel to one another.

11. The device as defined by claim 10, wherein said scanning unit is disposed movably relative to a reflector unit in at least one direction, and said reflector, said light source, and said detector arrangement are disposed in said reflector unit.

12. The device as defined by claim 1, wherein a measurement grating, a unification grating, and a first reflection grating are disposed on a side of said carrier substrate of said scanning plate facing toward said reflector, and a grating period of said measurement grating differs from a grating period of said unification grating, and the splitter and a second reflection grating are disposed on a side of said carrier substrate of said scanning unit remote from said reflector, so that by way of the splitter, said beam of light emitted by said light source undergoes splitting into a measurement beam and a reference beam, and said measurement beam is propagated in a direction of said reflector and in such process passes through said measurement grating, is reflected back in an incidence direction at said reflector, and after again passing through said measurement grating is propagated in a direction of said unification grating, and in said scanning plate, said reference beam is propagated via said first reflection grating and said second reflection grating in said direction of said unification grating and reaches said interferential superposition at said unification site with said measurement beam.

13. The device as defined by claim 12, wherein said detector arrangement is embodied as a structured photodetector, which includes a plurality of periodically disposed detector elements.

* * * * *